United States Patent [19]

Basso

[11] Patent Number: 4,728,263
[45] Date of Patent: Mar. 1, 1988

[54] WIND TURBINE BLADE CONSTRUCTION

[76] Inventor: Robert J. Basso, 3635 Afton Rd., San Diego, Calif. 92123

[21] Appl. No.: 900,085

[22] Filed: Aug. 25, 1986

[51] Int. Cl.$^4$ .............................................. B64C 11/20
[52] U.S. Cl. .................................... 416/226; 416/230; 416/218
[58] Field of Search ................... 416/226, 229 R, 232, 416/233, 204 R, 218, 230, 241 A

[56] References Cited

U.S. PATENT DOCUMENTS 3,168,144 2/1965 Capowich et al. .................. 416/226
3,476,625 11/1969 Slivinsky et al. .................... 416/226
4,260,332 4/1981 Weingart et al. .................... 416/218

Primary Examiner—Henry A. Bennet
Attorney, Agent, or Firm—Ralph S. Branscomb

[57] ABSTRACT

A strong, lightweight blade provided for use on wind turbines utilizes an interior reinforcing strut which extends part-way out the blade and consists of telescoped steel pipes welded to one another and mounted at their root ends to a steel cuff. A carbon graphite spar slips over the telescoped tubes and inside the cuff and extends radially outwardly substantially to the end of the blade. A rigid skin which is airfoil-shaped in all of its cross-sections attaches to the spar and spans from the root of the spar to the distal tip of the blade, defining the wind-driven surfaces of the blade.

11 Claims, 4 Drawing Figures

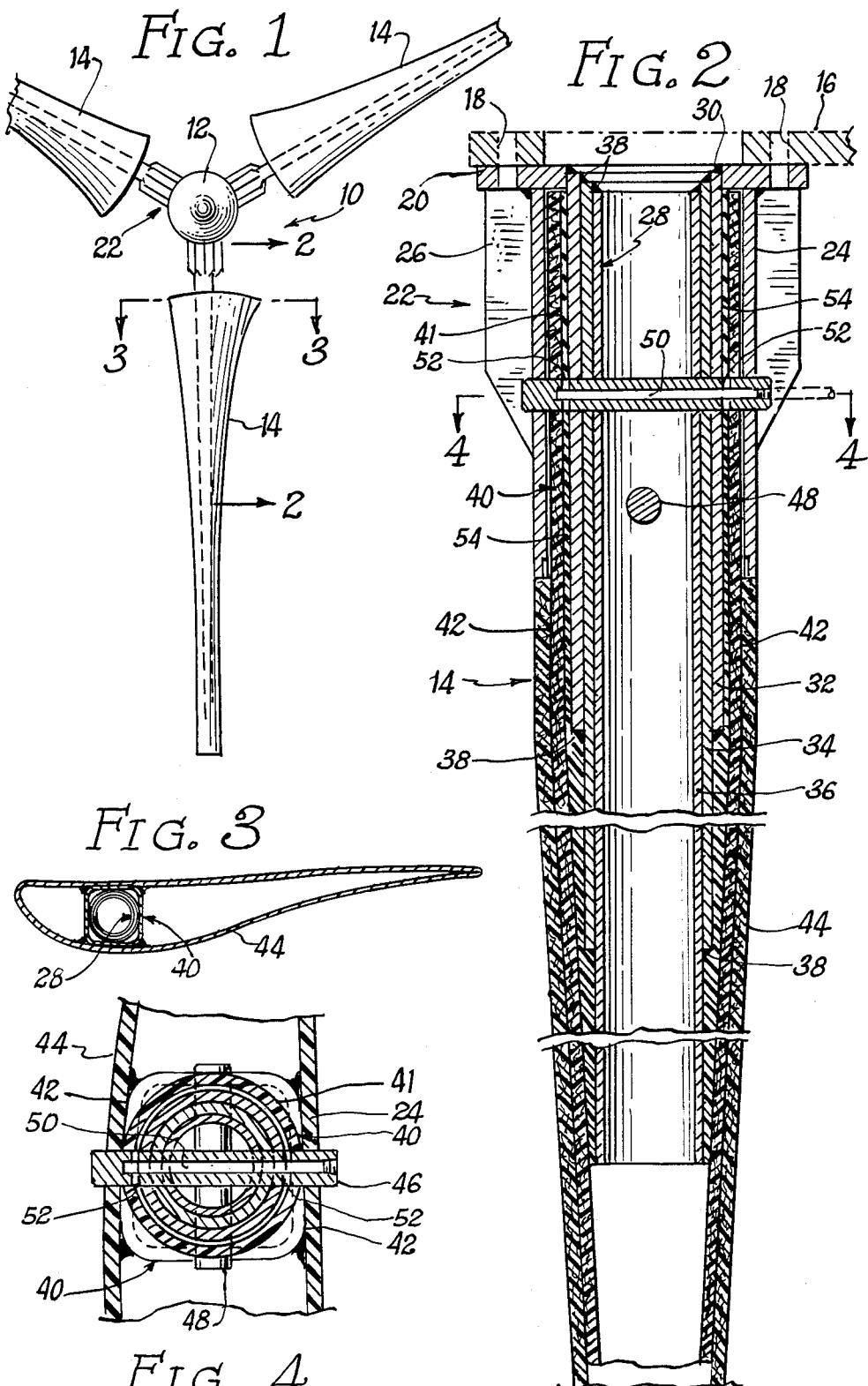
U.S. Patent  Mar. 1, 1988  4,728,263

WIND TURBINE BLADE CONSTRUCTION

BACKGROUND OF THE INVENTION

The invention is in the field of impellers and propellers, and in particular, pertains to the construction of an impeller blade for a wind turbine, although the scope of the invention is not limited to this use, as it might be useful in other types of impellers, and perhaps propellers as well.

The blade construction maximizes the strength versus the weight of the blade, as weight is a major consideration in large, rapidly rotating wind turbine rotors. The blade is designed to enable the entire length of the blade to be externally configured to define an airfoil in cross-section and every point along its length, particularly at its root, requiring that the internal reinforcement structure be sufficiently narrow in diameter that the airfoil cross-section at that region need not be of oversized height, destroying the airfoil shape and thus reducing the efficiency of the rotor.

Wind turbines must endure enormous destructive forces during their operation. Because wind is a natural force and cannot be controlled, the wind turbine must accommodate and survive wind conditions varying from no wind at all to gale force winds. Every wind turbine must have some mechanism to accommodate high winds. Either the turbine is shut down altogether, or a brake mechanism is incorporated to prevent the turbine from going too fast, and tearing itself apart. Any unbraked mechanism which is reasonably efficient at ordinary wind velocity would tear itself apart in high winds if some mechanism for stopping the rotor or governing its speed were not used.

Although the use of the instant blade goes beyond its immediate application, it was designed for use on a wind turbine with adjustable-pitch blades, that is, blades having a mechanism to vary the blade pitch at all operable wind speeds to maintain a steady 120 rotor revolutions per minute.

Design considerations of the blade and its rotors naturally include a careful balancing of the rotor to reduce vibration, and construction of the rotor blades such that they are as lightweight as possible to reduce the strain on the tower, and so that they are not subject to resonance and harmonic vibration at their operating speeds. Also, the blades must have considerable strength to endure the buffeting of the winds and the stress they experience being constantly exposed to natural forces.

The most stressed region of the blade is at its root, where the moment arm of the blade is quite high and could snap the blade off its rotor if the root, and the junction of the root to the rotor, were not extremely strong. A typical lightweight rotor blade is made as a hollow fiberglass and resin skin to maximize strength while minimizing weight. The internal support structure for the external skin, particularly where the blade mounts to the rotor, must be very well engineered. Otherwise, the support structure will either be too large to permit the exterior of the blade to assume a true airfoil cross-section adjacent the root, or if it is a solid bar, for instance, weight of the blade would be increased more than is absolutely necessary to secure the required strength.

Another design consideration of some importance in the construction of blades for wind turbines is the fact that because the mechanism takes such abuse from the elements and is thus subject to metal failure, it is desirable that the entire internal support be such that a failure in one portion of the steel support will not propagate throughout the entire support structure, causing the blade support to fail, the blade to fly off, and the wind turbine to "crash."

SUMMARY OF THE INVENTION

The instant invention addresses the above-stated design criteria, and comprises a blade having a fiberglass and resin skin which extends the entire length of the blade and defines the blade's aerodynamic surfaces. Moving along the skin moves from its distal end toward its central root region, it increases in lateral cross-section, maintaining a true airfoil cross-section oriented into the wind by the pitch adjustment mechanism to act as an airfoil at its designed operating speed of 120 cycles per minute.

The exterior, airfoil skin is supported throughout virtually its entire length by an internal, lightweight, hollow spar which is fabricated from carbon graphite in the preferred embodiment. This spar is bonded by resin along a strip at the top and bottom of the airfoil skin throughout its length. At the root of the spar, it changes in cross-section from a shape which approximates the contour of the airfoil along the two radial strips to which it bonds, to a cylindrical shape which fits inside the cylindrical steel cup which mounts to the rotor.

Inside the spar at the root region, there is a steel reinforcing strut which is welded to the cuff which mounts to the rotor, and extends outwardly between four and five feet into the spar. This reinforcing strut is at the heart of the invention, and actually comprises three telescoped steel pipes or tubes of graduating lengths, with each internal tube being longer than its external tube to define a narrowing diameter at the outer reaches of the reinforcing strut. These tubes are welded together, and the region between the three tubes and the surrounding carbon graphite spar is filled with epoxy resin for an extremely strong and durable bond.

The strength of the bonding of the spar and the internal reinforcing strut is increased by passing two 1" diameter steel pins, at right angles and at radially spaced positions, through the cuff, spar and reinforcing strut adjacent the root ends of the blade. One of these pins defines an internal passage communicating with the region between the spar and the reinforcing strut to enable this area to be filled with epoxy resin after assembly.

BRIEF DESCRIPTION OF THE DRAWINGS

FIG. 1 is a partial view of a wind turbine which utilizes the instant blade;

FIG. 2 is a section taken along 2—2 of FIG. 1, illustrating the construction of the telescoping pipes and other structure around the root region of the blade;

FIG. 3 is a section taken along line 3—3 of FIG. 1; and,

FIG. 4 is a section taken along line 4—4 of FIG. 2.

DETAILED DESCRIPTION OF THE PREFERRED EMBODIMENT

The type of wind turbine to which the blade is mounted in the preferred embodiment is illustrated in FIG. 1 at 10. The turbine has a central rotor 12 and mounts three blades 14. The turbine is shown in FIG. 1 to establish the environment of the invention, as the blade itself, three of which would be used in the turbine, defines an invention which is more or less independent of the rotor and wind turbine configuration.

As seen in FIG. 2, a mounting plate 16 which is part of the rotor has bolt holes 18 which align with bolt holes in the base plate 20 of the cuff 22. The cuff 22 is constructed of steel in the preferred embodiment and includes the aforementioned base plate 20, a cylindrical collar 24 which extends radially outwardly to mount the principal reinforcing members of the blade, and reinforcing ribs 26 which are 8 in number in the preferred embodiment. The components of the cuff are welded together into the described and illustrated configuration, and the cuff is in turn bolted to the mounting plate 16 of the central hub. This of course is done after the construction of the blade is finished, which will be described below.

The baseplate 20 of the cuff is annular, and into the circular central opening is welded the root end of the reinforcing strut 28 as indicated at 30. The reinforcing strut is actually a composite of 3 telescoped struts 32, 34 and 36, which define the outermost, the middle, and the innermost of the steel pipes which telescope flush against one another, and each of which is welded to adjacent pipes at both their inner root ends and at the other ends as indicated at 38. As can be seen in FIG. 2, the tube 32 is shorter than 34, and tube 34 is shorter than tube 36, so that as the reinforcing spar progresses radially outwardly toward the distal end of the blade, it has an effective reduced diameter to accommodate the reduced diameter of the spar, discussed below, and the airfoil skin.

In the preferred embodiment, the blade is about 20 feet long and the tube 32 is 16 inches long, the next tube (34) is 35" long, and the innermost tube extends 54" into the length of the spar. Thus, the reinforcing strut extends on the order of 22.5% of the entire length of the blade out into the spar.

There are several reasons why the telescoped steel tube or pipe construction is used and why it is advantageous to a solid design. First, it is crucial that enormous strength be provided at the root area of the blade while minimizing the cross-section so that the exterior shaped skin can conform to a true airfoil shape and not be bloated or distorted in thickness to pass over a wide reinforcement. The instant construction provides that strength and is ideal for several reasons. Inherent in its construction is the stepped reduction in the external diameter of the strut at two stages, to accommodate the decrease in size of the reinforcing spar and the airfoil skin, and the stepped construction obviously provides more strength, and the accompanying increase in weight, closest to the root of the blade where the moment arm causes such intense stress.

Additionally, because the strut is actually three separate pipes or tubes, there is some flexure and slippage between the pipes even though they are welded together at the ends, which makes the construction more resilient and yielding than a solid strut.

Further, yet another advantage lies in the fact that the development of cracks or a failure in any one of the tubes will not propagate to the next, providing a fail-safe mechanism inherent in the construction.

Thus in summary of the advantages of the telescoped strut construction, it basically minimizes weight and maximizes strength, with the natural inherent decrease, in stepped fashion, of diameter and strength radially outwardly, and it inherently resists the propagation of failures in any of the individual pipes.

As mentioned above, the reinforcing strut 28 is welded to the annular base plate 20 at 30. The next significant reinforcing member is the reinforcing spar 40 which is an ovate rectangle in cross section and which in its preferred embodiment is of carbon graphite fiber construction for maximum strength at minimum weight, and also because of the very high fatigue resistance of this material. The fact that the carbon graphite spar has a resonant frequency much higher than the frequencies of the harmonic motions which the turbine will experience during ordinary operation, makes it additionally valuable. The high speeds at which the rotor operates, and the intense stresses and forces that it experiences, make avoidance of the possibility that any component will going into oscillation at a resonant frequency a very real design consideration.

The lightweight spar 40 extends substantially the entire length of the blade. At its innermost end, the spar is formed as a cylinder 41 so that it will fit between the collar 24 on the outside, and the reinforcing strut 28 on the inside. Once the spar exits the collar 24 of the retaining cuff, it expands into a more rectangular configuration, having sides 42 that generally conform to the interior surfaces of the airfoil skin 44. The sides of the spar are bonded to the interior surfaces of the airfoil along its entire length with epoxy resin.

Once the spar is in place, two bores are drilled orthogonally through the entire root structure, passing through the cuff collar, the spar, and the reinforcing strut. The first pin 46 is then driven through the first bore, and a second pin 48 is driven through the second bore. These pins are 1" diameter steel pins, and the first pin 46 contains an axial bore 50 defining an internal passageway communicating with the ports 52 which communicate between the central passageway and a void 54 between the spar and the reinforcing strut.

The purpose of the passageway through the retaining pin is to enable the blade to be positioned upright with the distal end pointing upward and the root at the bottom, and the void 54 filled with liquid epoxy resin through the voids in the pin 46. As this void is filled, the level of the epoxy rises until it reaches an overflow hole drilled through the spar just below the top (in the upright orientation) of the longest pipe 36. During the filling process, at the point when resin begins to seep from this hole, it is known that the void is full, and the hole is taped shut and the resin pumping is stopped. The second pin 48 is a straight, solid steel retaining pin with no voids.

The fiberglass and resin skin 44 is sufficiently rigid to maintain its shape by virtue of its epoxy resin bonding to the conforming surfaces 42 of the spar 40. The airfoil-shaped skin extends all the way in toward the rotor 12, coming all the way up to the edge of the collar 24, maintaining its airfoil shape all the way. Even at these radially inner reaches, considerable force is derived from the wind provided the skin can maintain its true airfoil shape, which of course it does in the instant configuration by virtue of the design of the support structure internally of the skin.

Before the airfoil skin is bonded into place on the spar, additional strengthening is provided by filling the area between the collar 24 of the retaining cuff in the spar with epoxy resin as well. Thus, there is a solid bond extending all the way from the outer collar through to the innermost pipe 36 of the retaining spar. Reinforced even further by the welding of the pipes of the spar one to another and to the annular base plate of the cuff, and even further by the passage of the 1" steel retaining pins 46 and 48 completely through the structure, an extremely strong blade is defined in the root region to withstand enormous centrifugal forces tending to pull the blade out of its socket, and torsional forces exerted in the root region by the large moment arm of the blade.

The spar as described and claimed herein is a single spar, but the term is used to include multiple smaller diameter spars, or a "composite" spar composed of several bonded together, as well as the single-cell structure shown and described herein.

Although the blade is described in the preferred embodiment for use on a 3-blade wind turbine, the basic blade construction could be advantageous in a wide variety of blade applications, including use of the blade as a fan or propulsive propeller, as well as an impeller as for a wind turbine. Although the shape of the exterior skin might change to accommodate different implementations of the structure, nonetheless the very strong and lightweight construction which finds great advantage in the use of wind turbines, will likely just as well be advantageous in other applications.

I claim:

1. A blade for the rotor of a wind turbine or the like having a root end mounted on the rotor and extending generally radially outwardly from the rotor out to a distal end, said blade comprising:
   (a) a cuff at the root end of the blade for mounting on the rotor, and having a generally cylindrical, radially outwardly directed collar;
   (b) a generally cylindrical reinforcing strut mounted generally coaxially to said collar, and extending radially outwardly from said rotor throughout a portion of the length of said blade;
   (c) a hollow spar coaxially mounted around said strut and extending substantially the full length of said blade;
   (d) an elongated, rigid aerodynamic skin defining the exterior, wind-encountering surfaces of said blade, and being mounted over and bonded to said strut and defining the distal end of said blade;
   (e) said reinforcing strut being of decreasing diameter toward the distal end of said blade; and,
   (f) said reinforcing strut comprising a plurality of telescoping tubes of graduated length with the larger diameter tubes being longer than the smaller diameter tubes.

2. Structure according to claim 1 wherein each of said tubes having a contiguous outer tube is welded to said outer tube around the rim of each end of the inner tubes.

3. Structure according to claim 2 wherein said tubes terminate at their root ends slightly stepped from one another and welded together at the stepped ends.

4. Structure according to claim 3 wherein the tubes are metallic, said cuff includes an annular base plate generally orthogonally extended relative to said substantially cylindrical collar, and said collar and outermost of said tubes are welded to said base plate.

5. Structure according to claim 2 wherein said tubes are three in number.

6. A blade for the rotor of a wind turbine or the like having a root end mounted on the rotor and extending generally radially outwardly from the rotor out to a distal end, said blade comprising:
   (a) a cuff at the root end of the blade for mounting on the rotor, and having a generally cylindrical, radially outwardly directed collar;
   (b) a generally cylindrical reinforcing strut mounted generally coaxially to said collar, and extending radially outwardly from said rotor throughout a portion of the length of said blade;
   (c) a hollow spar coaxially mounted around said strut and extending substantially the full length of said blade;
   (d) an elongated, rigid aerodynamic skin defining the exterior, wind-encountering surfaces of said blade, and being mounted over and bonded to said strut and defining the distal end of said blade;
   (e) said spar having a root end which is cylindrical and engages around said reinforcing strut and inside the cylindrical collar of said cuff.

7. Structure according to claim 6 wherein said spar, reinforcing strut, and collar have at least one common transverse bore therethrough and including a retaining pin passed through said bore.

8. Structure according to claim 7 wherein said reinforcing strut and spar are mutually spaced to define a void, at least in part, and said retaining pin contains an internal passageway commuting through one end thereof and having ports communicating between said passageway and said void for the injection of liquid resin into the void.

9. Structure according to claim 8 and including reinforcing resin filled between said spar and strut.

10. Structure according to claim 9 and including a resin fill between said collar and said spar.

11. Structure according to claim 8 and including at least one additional transverse bore through said collar, spar, and strut, and including a solid pin in said additional bore.

* * * * *